(No Model.)
J. T. APPLEBERG.
PERCOLATOR FOR COFFEE POTS.
No. 512,675. Patented Jan. 16, 1894.
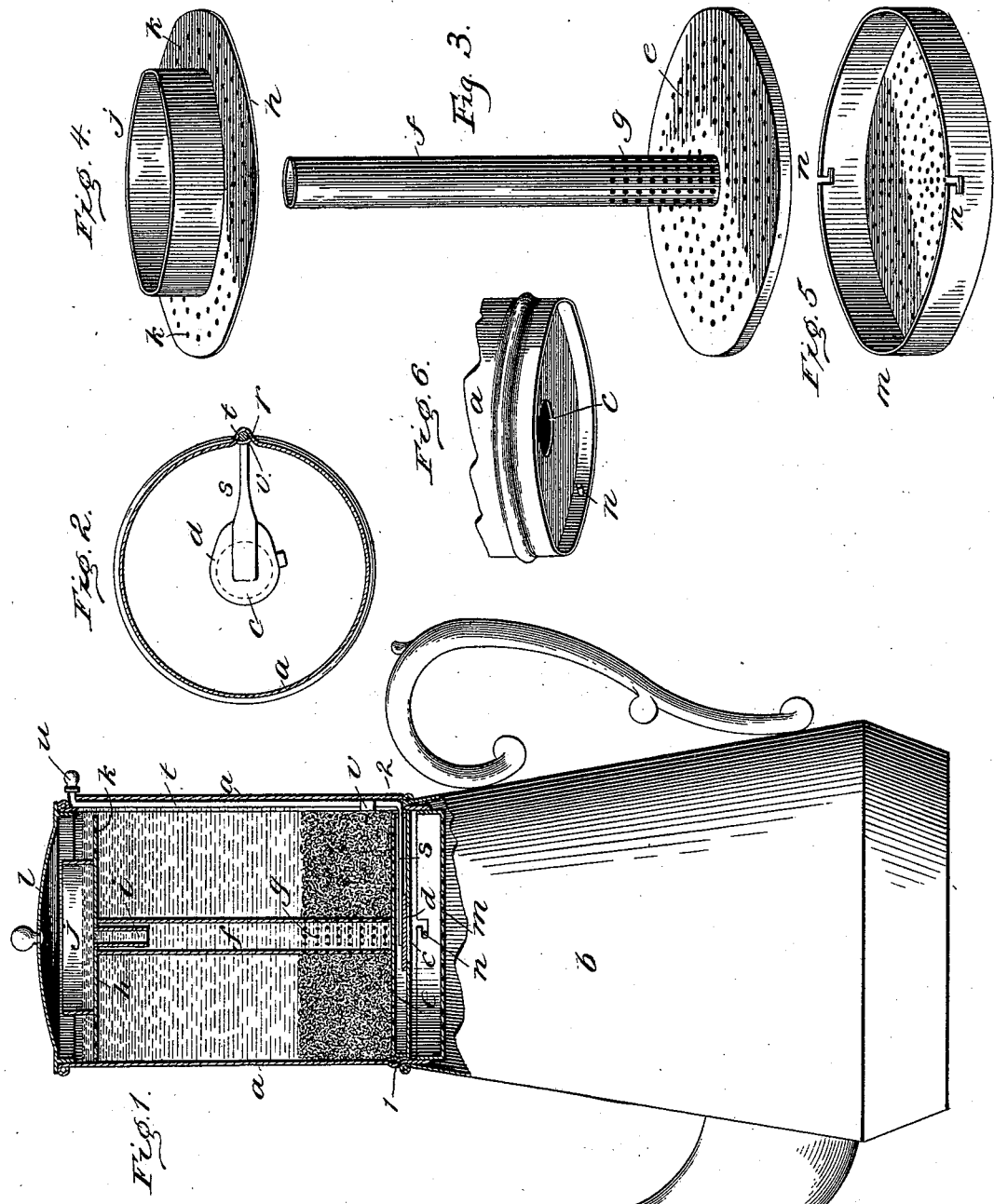
WITNESSES:
Edwin L. Bradford
INVENTOR
John T. Appleberg
BY Johnson & Johnson
his ATTORNEYS.
THE NATIONAL LITHOGRAPHING COMPANY,
WASHINGTON, D. C.

UNITED STATES PATENT OFFICE.

JOHN T. APPLEBERG, OF WASHINGTON, DISTRICT OF COLUMBIA.

PERCOLATOR FOR COFFEE-POTS.

SPECIFICATION forming part of Letters Patent No. 512,675, dated January 16, 1894.

Application filed May 24, 1893. Serial No. 475,311. (No model.)

*To all whom it may concern:*

Be it known that I, JOHN T. APPLEBERG, a citizen of the United States, and a resident of the city of Washington, in the District of Columbia, have invented certain new and useful Improvements in Percolators for Coffee-Pots, of which the following is a specification.

The device which I have provided for making infusions or extracts is a percolator especially adapted for use with a suitable pot for conveniently and quickly making coffee, whereby under the operation of a double percolation through the ground coffee, of water brought to a boiling heat, the best results are obtained in extracting the strength and delivering the infusion without the slightest change of its natural color or its aroma. In this double percolation the hot water is caused first to pass directly into and upward through the body of the ground coffee into and filling the retainer and secondly directly through the body of the ground coffee in a downward percolating flow from the retainer into the pot for use. In this way the infusion is retained within the vessel wherein it is made and delivered therefrom as it is to be drunk, keeping its flavor and delivering it with the desired strength. The device is of simple construction and its parts are all separable for convenient placing and removing of the ground coffee, for introducing the hot water and for delivering the decoction, and keeping the different parts perfectly clean. I have found that to pass hot water once through ground coffee, is not sufficient to extract the strength therefrom and that the the second filtration not only does this with satisfactory results, but the natural taste and color of the coffee is preserved, and this by reason of retaining the made coffee in the percolator. It is the retention of the infusion in direct contact with the ground coffee for any desired time that gives the perfect extraction of all the aroma, strength and natural flavor, and this from a less quantity of coffee than by a method which permits the hot water merely to pass through the ground coffee in a single percolation and without retention, in contact with the coffee.

The accompanying drawings illustrate my percolator as it is designed and applied to use in making coffee, and in the claims concluding this specification I will set out the improvement therein.

Referring to the drawings: Figure 1 shows the percolating device in vertical section as it is applied for use upon a pot. Fig. 2 is a horizontal section taken above the delivery valve of the percolator as indicated by the line 1—2 of Fig. 1. Fig. 3 is a central tube into and through which the hot water is introduced into the percolator, and disk upon which the ground coffee is put. Fig. 4 shows the cup with which the central tube connects to introduce the hot water. Fig. 5 shows the bottom cup through which the decoction is strained as it is delivered for use from the retainer; and Fig. 6 shows the valved delivery opening in the bottom of the percolator.

The device consists of a vessel $a$ within which the coffee is made. It is open at its top, closed at its bottom and adapted to be fitted upon and within the open top of a coffee pot $b$ of any suitable kind so as to close it. The bottom of this top vessel has a central opening $c$, which is controlled by a plate valve $d$ the purpose of which I shall presently state. Upon this bottom rests so as to permit the free movement of the valve, a perforated disk $e$ from which centrally rises a tube $f$, which is closed at its fixed connection with the disk, but above the latter the tube is provided with perforations $g$ in its walls. This tube is of less height than that of the coffee containing vessel, is open at its upper end and supports a disk $h$, from which depends a short tube $i$ within the open end of the perforated tube and opens into a cup $j$ preferably formed upon the said top disk, which, outside of this cup, has perforations $k$. These two disks are made to fit freely within the vessel and the lower one serves to support the ground coffee; while the upper one serves to form the cup through which boiling hot water is introduced into the perforated tube from which it passes into the ground coffee and rises by filtration through the ground coffee into the vessel. A cap $l$ covers and closes the vessel while the coffee is being made. The upper disk is supported a distance below the top of the vessel to allow the decoction to overflow through its perforations if it be so desired to show the color of the coffee as it is being made and to thereby tell when it is at the proper strength, as a shallow body of the fluid will tell this at once, as is seen by removing the cover and while filling the vessel with hot water through the cup.

Below the bottom of the vessel, a cup m is suitably attached and its bottom is perforated. As shown its attachment is made by a well known slot and pin fastening n to permit of its easy removal and replacement and this cup part depends within the coffee pot and merely serves to catch and hold any particles of coffee which may pass with the infusion from the retainer, as it is delivered therefrom. This delivery is controlled by the valve d which thereby serves to retain the decoction in the vessel where it is made. I prefer to make this valve of a plate carried on the end of a spring arm s the tension of which constantly tends to press and hold the valve down to make a closed joint. This spring arm connects with the lower end of a rod t, which is preferably fitted in a groove r formed on the inner wall of the vessel as seen in Fig. 2, so as not to interfere with the placing and removing of the disks into and from the vessel. The upper end of the rod passes out at the top of the vessel through a hole and is knobbed to form a crank-handle u by which to rock the rod and move the valve to close or to uncover the outlet opening in the bottom of the vessel. When the vessel is made of metal this groove may be made in the manner of a bead. The lower end of the valve-rod is retained in place by a clip or eye v soldered or otherwise fastened to the inner wall; and it will be understood that it is by means of this valve that the coffee is retained in the vessel while being made and after it is made and that it is delivered therefrom as may be desired into the pot to be poured therefrom as may be desired for use. In making the coffee however, the important feature of my improvement is the provision whereby the hot water is subjected to an upward filtering flow as it passes from the central tube through its perforations into and through the ground coffee, extracting from it a portion of its strength and filling the vessel wholly or partially and after standing a few moments it is ready for use. The hot water should be poured into the tube a little slow so as to give the upward filtration the best effect. To deliver the fluid after such partial infusion it is caused to pass back through a second and downward filtration through the ground coffee, when the valve is opened, and this is what I mean by the double or upward and downward filtration to make the perfect coffee and turn it into the pot with the aroma unchanged. By this method it will be seen that the hot water first filters up through the ground coffee by its outward flow from the center-tube, and then filters downward, through the ground coffee, and it is in this latter filtering flow that I provide the bottom cup to catch any particles of the ground coffee that may pass the perforated disk on which the coffee rests as seen in Fig. 1.

The percolating device I make of porcelain, or of tin, and of different styles for and use with plain or any desired style of pot.

It is obvious that the valve carrying rod may be placed on the inner wall of the percolator, in which case the disks of the central tube and of the filling cup are provided with circumferential notches to pass over said rod.

While I have shown and described the percolator in its use in making coffee, it is obvious that the valved vessel with the bottom cup strainer may be used for making tea, in which case, the central tube, its perforated disk and the filling cup are removed. It is also obvious that the complete percolator may be used for making infusions or extracts from one or more substances for other purposes.

It is obvious that the central tube may be made with its disks and filling cup in one piece, in which case the filling cup disk is fixed on the upper end of the tube; and that the upper disk may be dispensed with; and that the movement of said valve may be controlled by suitable stops.

I claim as my improvements—

1. In a percolator, the combination with a vessel, of a valve controlled bottom opening therein a strainer-disk and filling tube above said valve, and a strainer below said valved opening, substantially as described.

2. In a device for making infusions, the combination, with a vessel having a valve controlled opening, of a perforated disk above said valved opening, forming a supplemental bottom and having a central tube closed at its connection with said disk and having wall perforations above the latter, and a filling cup at the top of said tube, substantially as described.

3. In a percolating device, a vessel having a bottom opening, a plate-valve controlling said opening, an operating rod for said valve having a spring function tending to press said valve downward to make a close bottom joint, a perforated disk above said valve, and a perforated tube fixed to and rising centrally from said disk and having a top filling cup, substantially as described.

4. A percolator consisting of a vessel having a central opening in its bottom, a spring pressed valve for controlling said opening, a supplemental perforated bottom above said valve having a perforated central tube rising therefrom, a top perforated disk having a filling cup, and removably supported upon said tube, a cover inclosing said vessel and filling cup, a removable bottom filtering cup, and a handled rod connected for operating said valve and fastened on the inner wall of said vessel, substantially as described.

In testimony whereof I have hereunto signed this specification in the presence of two witnesses.

JOHN T. APPLEBERG.

Witnesses:
A. E. H. JOHNSON,
GUY H. JOHNSON.